M. SEWARD.
Stay-End Clip.
No. 198,051. Patented Dec. 11, 1877.
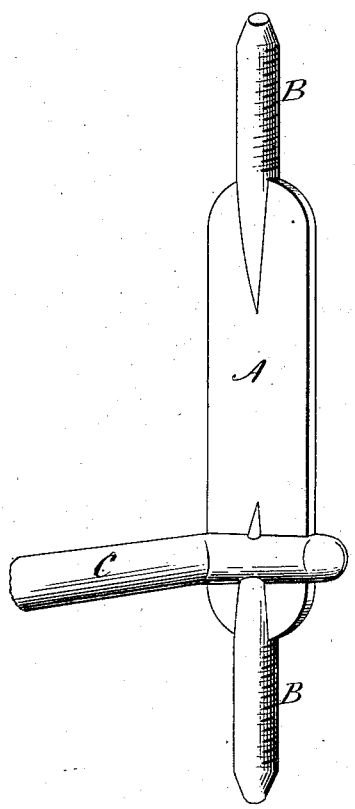
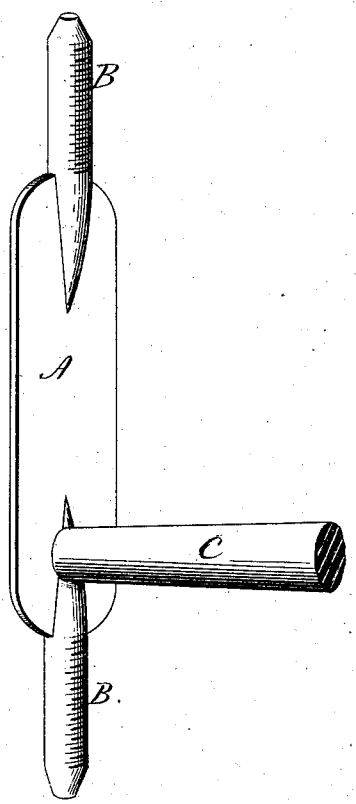

UNITED STATES PATENT OFFICE.

MOSES SEWARD, OF NEW HAVEN, CONNECTICUT.

IMPROVEMENT IN STAY-END CLIPS.

Specification forming part of Letters Patent No. 198,051, dated December 11, 1877; application filed February 5, 1877.

*To all whom it may concern:*

Be it known that I, MOSES SEWARD, of New Haven, in the county of New Haven and State of Connecticut, have invented a new Improvement in Stay-End Clips; and I do hereby declare the following, when taken in connection with the accompanying drawings and the letters of reference marked thereon, to be a full, clear, and exact description of the same, and which said drawings constitute part of this specification, and represent, in—

Figure 1 a perspective view; and in Fig. 2, a perspective view of a modified form.

This invention relates to an improvement in what may be called "stay-end clips"—that is to say, a device for securing the stay or brace ends of the running-gear of a carriage, the object being to combine the stay directly with the clip.

It consists in constructing the clip with an arm projecting from the plate, to which the smith receiving the clip may weld an extension to form the brace.

A is the plate of the clip; B, the screw, which is formed upon each end. The clip may be of any of the known shapes. At the proper point on the surface of the plate A an arm, C, is formed, projecting therefrom, and may be, as seen in Fig. 1, turned at an angle from the plate, or projecting directly therefrom, as seen in Fig. 2. The length of this arm should be sufficient to allow heating and welding without material effect upon the clip proper.

In this condition the clips are furnished to the trade, and the smith receiving them extends the arm C by welding thereto, according to the style of the braces required.

By thus forming the stay-end a part of the clip, a much firmer structure is produced than where the stay-end is simply inclosed by the clip, or perforated to pass over the clip-bolt.

It will be understood that the clip will be bent by the smith to surround the perch or axle, as the case may be, in the usual manner for other clips.

I do not broadly claim a clip having the means of attaching some part of the running-gear thereto.

I claim—

As an article of manufacture, the herein-described stay-end clip, consisting of the plate with the screw at each end, and a brace-arm projecting from the plate, substantially as described.

MOSES SEWARD.

Witnesses:
JOHN E. EARLE,
CLARA BROUGHTON.